J. A. CAMPBELL.
LOCK FOR AUTOMOBILES.
APPLICATION FILED MAY 21, 1912.
1,089,319.
Patented Mar. 3, 1914.
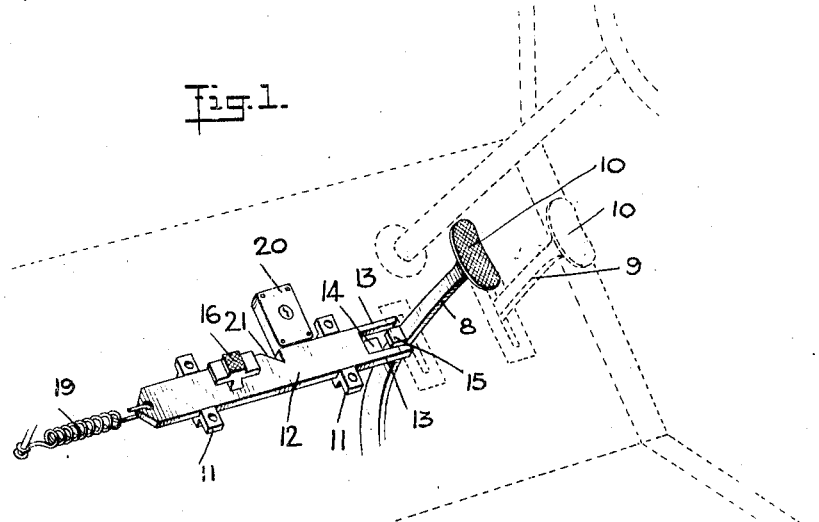
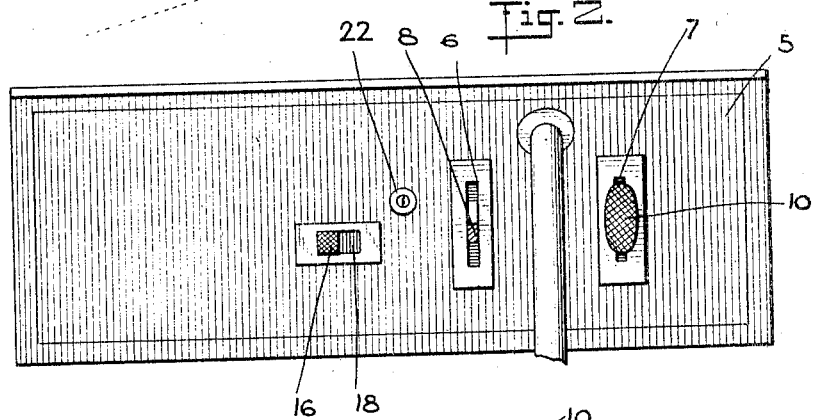
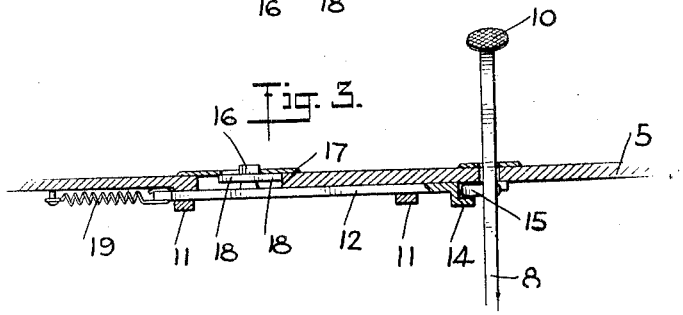
WITNESSES
E. B. Marshall
INVENTOR
John A. Campbell
BY Munn & Co.
ATTORNEYS

UNITED STATES PATENT OFFICE.

JOHN ALPHUS CAMPBELL, OF CARBONDALE, ILLINOIS.

LOCK FOR AUTOMOBILES.

1,089,319.

Specification of Letters Patent. Patented Mar. 3, 1914.

Application filed May 21, 1912. Serial No. 698,742.

*To all whom it may concern:*

Be it known that I, JOHN A. CAMPBELL, a citizen of the United States, and a resident of Carbondale, in the county of Jackson and State of Illinois, have invented a new and Improved Lock for Automobiles, of which the following is a full, clear, and exact description.

My invention relates to automobiles, and it has for its object to provide one with a lock, the lock having a bar with a lug which may be moved into engagement with a lug on a foot pedal arm for operating the clutch, so that when the bar is secured with its lug engaging the lug on the arm it will be impossible to drive the automobile.

Additional objects of the invention will appear in the following complete description of the invention, in which the preferred form of the invention is disclosed.

In the drawings similar characters of reference indicate corresponding parts in all the views, in which—

Figure 1 is a perspective view showing how the improvement is mounted on an automobile; Fig. 2 is a view of a bottom member of an automobile as it appears when the improvement is mounted thereon; Fig. 3 is a sectional view of the bottom boards showing my improvement.

Automobile owners are constantly put to considerable expense for gasolene, lubricating oil and repairs by the unauthorized use of their cars. While, of course, it is possible to remove parts of the automobile, and in this way prevent its use on the road, this is never convenient, for it means that the car cannot be run until the parts are replaced, which causes considerable delay. It is also dangerous to lock the automobile by chaining the front and rear wheels together, and locking the links with a padlock, since it may be necessary to remove the automobile quickly and a considerable distance, in case of fire.

While my improvement makes it impossible to use the automobile on the road, because of the locking of the means for operating the clutch, it still gives the automobile some freedom of action, and it is possible to push the automobile about the garage as may be desired.

By referring to the drawings it will be seen that the bottom member 5 of the automobile is of the usual construction with the slotted members 6 and 7 in which the arms 8 and 9 are disposed, the said arms 8 and 9 being provided with pedals or foot members 10, by which they may be readily operated. On the underside of the bottom member 5 there are secured guide members 11, in which the bar 12 is disposed for sliding, this bar member 12 having extending arms 13, which are disposed one in front and one in the rear of the arm 8. The bar 12 also having a flange 14 disposed between the arms 13, this flange 14 being adapted to engage the flange 15 on the arm 8, so that it will be impossible to operate the said arm 8, making it impossible to throw in the clutch and propel the automobile by its engine. Secured to the upper side of the bar 12 there is a lug 16, which is disposed through a slot 17 in the bottom member 5, there being also flanges 18 on the lug 16 which engage the ends of the slot 17 in the bottom member 5, for limiting the movement of the said lug 16. It will be understood that the bar 12 may be readily drawn to the right by the movement of the foot of the chauffeur on the said lug 16. The spring 19 which connects the bar 12 with the bottom member 5 serves to hold the bar 12 yieldingly to the left when the automobile is in use. To lock the bar and to hold it in engagement with the flange 15 on the arm 8, I provide a lock 20, which has a bolt adapted to be disposed in the recess 21 in the bar 12, when the bar 12 is moved to the right, and the flange 14 is in engagement with the flange 15 on the arm 8. In the bottom member 5 there is a key hole 22, by which it is possible to insert a key in the lock to throw the bolt into or out of the recess 21 in the bar 12. As the arm 8 is connected with the means to operate the clutch it will be seen that when the arm 8 is locked, it will be impossible to drive the automobile with its engine. The arm 9 is the usual arm for operating the brake.

Having thus described my invention I claim as new and desire to secure by Letters Patent:

1. In combination with a member to be locked, a stationary support, guide members on the stationary support, a horizontal bar having arms spaced apart and extending from an end of the horizontal bar, the arms being normally disposed at opposite sides of the member, a flange at the end of the horizontal bar extending in the direction of the member, a flange on the member extending in the direction of the first-mentioned flange, and a spring for holding the horizontal bar with the first flange out of engagement with the second flange.

2. In combination with a member to be locked, a stationary support, a bar having arms spaced apart and extending from an end of the bar, the arms being normally disposed at opposite sides of the member, a flange at the end of the bar, extending in the direction of the member, a flange on the member extending in the direction of the first-mentioned flange, a spring for holding the bar with the first flange out of engagement with the second flange, and a lock having a bolt for engaging the bar for holding the bar and the first flange in a predetermined position relatively to the member and the second flange.

3. In combination with a member to be locked, a flange on the member, a stationary support, having an opening, a slot and a second opening, the member to be locked being disposed in the first-mentioned opening, guide members on the stationary support, a bar disposed on the guide members and having a lug disposed for moving in the slot, the bar being adapted to engage the projection on the first member to secure the first member, a lock secured to the under side of the stationary support, and provided with a key hole disposed in the second-mentioned opening in the stationary support, and a bolt in the lock for engaging the bar to secure the bar relatively to the stationary support.

4. In combination with a member to be locked, a stationary support with an opening, a slot and a second opening, the member to be locked being disposed in one of the openings, and being provided with a projection, guide members on the stationary support, a bar disposed in the guide members and having a lug disposed for moving in the slot, a flange on the bar, the flange and the stationary support at the first-mentioned opening being adapted to be disposed one at each side of the projection on the first member for securing the first member, a lock secured to the under side of the stationary support, and provided with a key hole disposed in the second-mentioned member of the stationary support, and a bolt on the lock for engaging the bar to secure the bar relatively to the stationary support.

In testimony whereof I have signed my name to this specification in the presence of two subscribing witnesses.

JOHN ALPHUS CAMPBELL.

Witnesses:
H. K. TRAVELSTEAD,
M. E. BATSON.